United States Patent [19]
Haruta et al.

[11] Patent Number: 4,818,665
[45] Date of Patent: Apr. 4, 1989

[54] MEDIUM AND PROCESS FOR IMAGE FORMATION

[75] Inventors: Masahiro Haruta, Funabashi; Hiroshi Matsuda; Hirohide Munakata, both of Yokohama; Yukuo Nishimura, Sagamihara, all of Japan

[73] Assignee: Canon Kabushiki Kaisha, Tokyo, Japan

[21] Appl. No.: 27,050

[22] Filed: Mar. 23, 1987

Related U.S. Application Data

[63] Continuation of Ser. No. 710,686, Mar. 12, 1985, abandoned.

[30] Foreign Application Priority Data

Mar. 14, 1984 [JP] Japan ................... 59-47183
Mar. 14, 1984 [JP] Japan ................... 59-47184
Mar. 14, 1984 [JP] Japan ................... 59-47185
Mar. 14, 1984 [JP] Japan ................... 59-47186
Mar. 14, 1984 [JP] Japan ................... 59-47187
Mar. 14, 1984 [JP] Japan ................... 59-47188

[51] Int. Cl.$^4$ .............................. G03C 1/72
[52] U.S. Cl. ...................... 430/494; 430/19; 430/21; 430/56; 430/270; 430/346; 430/541; 430/495; 430/496; 430/936; 346/150; 346/135.1
[58] Field of Search ............... 430/19, 21, 495, 496, 430/936, 270, 644, 494; 346/76 L, 135.1

[56] References Cited

U.S. PATENT DOCUMENTS 4,062,685 12/1977 Takeda et al. ................... 430/495
4,106,939 8/1978 Chang et al. .................... 430/495
4,184,741 1/1980 Takeda ........................... 430/341
4,539,061 9/1985 Sagiv ............................. 428/420
4,618,561 10/1986 Munakata et al. ................ 430/945

FOREIGN PATENT DOCUMENTS 45622 4/1975 Japan.
109720 8/1975 Japan.
130218 11/1977 Japan.

OTHER PUBLICATIONS

Chem. Abst. 145914a, vol. 77, 1972.
Snow and Jarvis, "Molecular Association and Monolayer Formation of Soluble Phthalocyanine Compounds", *J. Am. Chem. Soc.*, V. 106, pp. 4706–4711 (1984).
Geoffrey et al., J.A.C.S. 97:14, 3933–3936 (1975).
Shin Jikken Kagaku Koza, vol. 12, pp. 179 and 181.
Simon, et al., J.A.C.S. 102 No. 24, 7247–7251 (1980).

*Primary Examiner*—Paul R. Michl
*Assistant Examiner*—Mark R. Buscher
*Attorney, Agent, or Firm*—Fitzpatrick, Cella, Harper & Scinto

[57] ABSTRACT

A medium for image formation which comprises a monomolecular film or monomolecular built-up film of a metal chelate compound and a process for image formation which comprises (1) manipulating the adsorption of a gas on a metal chelate compound and the desorption of the gas therefrom or (2) reducing metal ions in molecules of a metal chelate compound.

2 Claims, 6 Drawing Sheets

MEDIUM AND PROCESS FOR IMAGE FORMATION

This application is a continuation of application Ser. No. 710,686 filed Mar. 12, 1985, now abandoned.

BACKGROUND OF THE INVENTION

1. Field of the Invention

The present invention relates to a novel medium for image formation and more particularly to a medium for image formation which comprises a monomolecular film or monomolecular built-up film of a metal chelate compound provided on a substrate.

The invention also relates to a novel process for image formation, and particularly to a process for image formation based on the application of active energy signals to a monomolecular film or monomolecular built-up film of a metal chelate compound to control adsorption and desorption of a gas on the film or to reduce metal ions in molecules of the metal chelate compound, thereby forming an image.

2. Description of the Prior Art

Various recording media and processes are known for recording images by applying optical, thermal, or electrical energy signals. Some of these media or processes have been put into practical use (see, for example, "Insha Kogaku (Printing Technology)", II, III, published by Kyoritsu Shuppan Co., Ltd.). In particular, there are many investigations on recording media and processes using metal chelate compounds. As an example, the recording medium disclosed by J. J. Robillard [Photographic Science and Engineering, 8, 28 (1964)], which forms a visible image on image exposure with a high voltage applied, is constructed as follows: Particles of a compound (e.g. CuSCN) which produces catalytic ions on light exposure, together with a color-forming material (a metal chelate compound, e.g. $Na[Co(C_5H_7O_2)_2(NO_2)_2]$) adsorbed around the particles, are dispersed in a binder; a conductive substrate is coated with a several microns thick layer of the resulting dispersion; this layer, acting as a recording film, is overlaid with a transparent plate such as a glass plate on which a transparent $SnO_2$ electrode is formed by vapor deposition. In this medium, a colored image based on metallic cobalt can be formed by image exposure of the medium while applying a high voltage between the $SnO_2$ electrode and the conductive substrate.

Another example of the chelate-based recording media is one disclosed in Japanese patent application Laid-Open Nos. 45,622/75 and 130,218/76. This medium is constructed by dispersing a tellurium metal chelate compound (e.g. dichlorotellurobisacetophenone) and a photosensitizer (e.g. pyrenequinone) in a binder, and coating the dispersion on a substrate. In this medium, a colored image based on metallic tellurium is obtained by image exposure followed by heating. As an example of media for image recording similarly to this by light exposure and heat treatment, the recording medium of Japanese patent application Laid-Open No. 109,720/75 is known, which comprises a β-diketonito-metal chelate compound and a photosensitizer.

A further example of the chelate-based recording media is a medium developed by Eastman Kodak Co. In this case, the image formation process is similar to the above; that is, a colored cobalt chelate image is reproduced by light exposure and heat treatment. As a modified example, there has been proposed a technique of color formation on a diazo paper by utilizing ammonia gas evolved from said recording medium during the heat development. More specifically, this recording medium is constructed by dispersing a hexamine cobalt III complex ($[Co(NH_3)_6]^{3+}3Cl^-$), a photosensitizer (e.g. quinone), and a compound (e.g. 1-(2-pyridylazo)-2-naphthol), hereinafter abbreviated as PAN) capable of forming a colored chelate jointly with cobalt ions, in a binder, and coating the dispersion on a substrate. On heating after image exposure of this recording medium, the cobalt in the exposed portion is reduced from trivalent to divalent and the divalent cobalt ion, jointly with the PAN, forms a chelate. This chelate undergoes a ligand exchange reaction with the hexamine cobalt complex (III), yielding a colored chelate of trivalent cobalt with PAN. The reaction chelating a divalent cobalt ion with completely free PAN is repeated to a yield the trivalent cobalt-PAN colored chelate according to a chain reaction, thus forming a visible image.

A still further example of the chelate-based recording media is a medium constructed of a supported layer of a mixture of a metal salt of higher fatty acid and a compound capable of forming, jointly with the metal of said salt, a colored chelate, dispersed in a binder, or otherwise two supported layers containing separately these compounds dispersed in a binder, wherein a colored image is developed corresponding to the recorded image by heating the medium to fuse together the metal salt and the chelating agent. For instance, a combination of zinc stearate with diphenyl carbazone gives a red image and the combination of ferric stearate with gallic acid gives a black-purple image.

These prior techniques, however, have the drawback of forming much blurred or fuzzy images because the thickness of the recording layer is as large as several microns in any of these media. Another drawback of these media is that when the recording layer is to be formed of a dispersion of recording compounds in a binder, coating operation using a solvent is necessary to apply the dispersion and the color forming reaction partly occurs during the coating step, this tending to cause so-called fogging. When recording compounds are distributed separately in plural recording layers in order to inhibit the above undesirable reaction, another drawback arises in which the efficiency of the reaction between these compounds is markedly lowered and further the resolution of images and the sensitivity are notably deteriorated. Additionally, when voltage application across these recording layers is necessary, a high voltage (e.g. several hundreds of volts) is required since the recording layers are thick as a whole.

SUMMARY OF THE INVENTION

An object of the invention is to provide an image forming medium highly sensitive to energy signals and an image-forming process using said medium.

Another object of the invention is to provide a novel medium and process for recording a fog-free, noiseless, high quality image with a high degree of resolution.

Still another object of the invention is to provide a novel reusable medium for image formation and a novel process for image formation using said medium.

A further object of the invention is to provide a highly sensitive medium for image formation not requiring high voltage.

A still further object of the invention is to provide a novel image forming medium superior in durability and economy.

BRIEF DESCRIPTION OF THE DRAWINGS

FIGS. 1A to 8B are schematic diagrams showing constructions of image-forming media according to the invention and principles of image formation when using these media.

DETAILED DESCRIPTION OF PREFERRED EMBODIMENTS

The image-forming medium of the invention is characterized basically by comprising a monomolecular film or built-up film of a metal chelate compound provided on a substrate.

The term "image-forming medium" used herein includes recording media and display media.

The metal chelate compounds capable of forming the monomolecular film or the built-up film of monomolecular layers, used in the image-forming medium of the invention, have chemical structure, analogous to that of so-called surface active agents, containing both a hydrophilic moiety and a hydrophobic moiety in the molecule. Most typical examples of the hydrophilic moiety are, a carboxyl group, metal salts thereof, and amine salts thereof, sulfonic acid group, metal salt thereof, and amine salts thereof, sulfonamide group, amide group, amino, imino, hydroxyl, quaternary amino group, hydroxyamino group, hydroxyimino group, diazonium group, guanidino group, hydrazino group, phosphoric acid group, silicic acid group, and aluminic acid group. Most typical examples of the hydrophobic moiety are long-chain alkyl groups generally having around 5 to 30, preferably about 10 to about 25, carbon atoms. These alkyl groups may be either linear or branched provided that the lengths thereof are suitable. Other examples of the hydrophobic moiety are; unsaturated hydrocarbon residues such as vinyl, vinylidene, and ethynyl; cyclic or condensed polycyclic aromatic residues such as phenyl, naphthyl, and anthranyl; and chain polycyclic aromatic residues such as biphenyl and terphenyl. One or more of these hydrophilic moieties may be combined with one or more of these hydrophobic moieties. In addition, these moieties may be positioned either separately on both ends of the molecular or on middle parts of the molecular. However, any metal chelate compound having an arbitrary combination of these hydrophilic and hydrophobic moieties in the molecule cannot always form a monomolecular film or a built-up film of monomolecular layers. In order to obtain such a film, a monomolecular film is required to be formed on a water surface in the manufacturing process. When the hydrophilicity is higher than the hydrophobicity in the molecule, the metal chelate compound dissolves in water, forming an aqueous solution. On the contrary, when the hydrophobicity surpasses, the chelate compound separates from the water into two phases. That is, a monomolecular film on a water surface can only be formed of a compound having an appropriate balance between the hydrophilicity and the hyrophobicity in the molecule. When such a metal chelate compound forms a monomolecular film, the molecules thereof are adsorbed on the gas-water interface with the hydrophilic moieties facing the water phase. Therefore, the metal-chelate compounds are required to have appropriately balanced hydrophilic and hydrophobic moieties.

Metal chelate compounds that can be used in the image-forming medium of the invention are further required to have one of the following performance characteristics.

A metal chelate compound capable of adsorbing and desorbing reversing a gaseous molecules under the action of activation energy.

$$IrX(CO)(PPh_3)(PPh_2Ph-R) \tag{1-a}$$

$$IrX(CO)(PR^1_3)(PR^2_3)Y \tag{1-b}$$

In these formulae; X represents a halogen atom such as Cl, Br, or I; Ph—R represents phenyl substituted by alkyl of 10 to 30 carbon atoms; Y represents $O_2$, $H_2$, $SO_2$, CO, HCl, HBr, olefin, or halogenated alkyl; and $R^1$ and $R^2$ represent alkyls of 10 to 30 carbon atoms respectively.

$$YCo(PPh_3)(PPh_2Ph-R) \tag{1-c}$$

where Y represents $H_2$, $N_2$, $Cl_2$, $I_2$ or CO; and Ph—R represents phenyl substituted by alkyl of 10 to 30 carbon atoms.

(1-d)

(1-e)

where R represents alkyl of 8 to 30 carbon aroms.

(II) A metal chelate compoud the metal ion of which can be reduced by the action of active energy to the metal.

(2-a)

In this formula; M represents $Ag^+$, $Cu^+$, or $Pa^{++}$; R represents alkyl of 10 to 30 carbon atoms; and X represents an anion such as $NO_3^-$, $Cl^-$, or $SO_4^{--}$.

(2-b)

In this formula; M represents $Ag^+$, $Cu^+$, or $Pd^{++}$; $R^1$ represents hydrogen, methyl, or ethyl; $R^2$ represetns alkyl or acyl each having 10 to 30 carbon atoms; and X represetns $NO_3^-$, $Cl^-$, or $SO_4^{--}$.

(2-c)

In this formula; M represents divalent Cu, Co, Fe, Mn, Ni, Zn, Pb, or Pd; $R^1$ represents hydrogen, methyl, or ethyl; $R^2$ represents alkyl or alkyl-carboxylic acid group, each alkyl having 10 to 30 carbon atoms; and X represents an anion such as $NO_3^-$, $Cl^-$, or $SO_4^{--}$.

A reducing agent, if used, needs to have a structure, analogous to those of so-called surface active agents, capable of forming a monomolecular built-up film similarly to the above metal chelate compound. Such reducing agents include, for example, the following compounds:

(2-d)

(2-e)

(2-f)

In order to form a monomolecular film of a mixture of a metal chelate compound and reducing agent on a substrate, the single component monomolecular films, formed from these components, need to have nearly equal thicknesses, that is, these components need to have almost the same molecular lengths.

(III) A metal-free ligand—metal chelate compound combination capable of undergoing the chelate ligand exchange reaction under the action of active energy.

(3-a)

In these formulae; $R^1$ represents alkyl, alkyl-carboxylic acid group, or a salt thereof, each having 1 to 30 carbon atoms in the alkyl group; $R^2$ represents alkyl of 1 to 30 carbon atoms; and $R^3$ represents alkyl carboxyl having 1 to 30 carbon atoms in the alkyl group or a salt thereof.

In these formulae; $R^1$ and $R^2$ each represent alkyl, alkylcarboxylic acid group, or a salt thereof, each having 1 to 30 carbon atoms in the alkyl group; X represents an anion such as $NO_3^-$, $Cl^-$, or $SO_4^{--}$; and Y represents halogen such as Cl, Br, or I.

(IV) A metal chelate compound capable of emitting (3-b)

and light under the action of the active energy of an electric field.

(4-a)

In these formulae, $R^1$ and $R^2$ each represent alkyl of 1 to 30 carbon atoms and X represents an anion such as $I^-$, $Cl^-$, $ClO_4^-$, $Br^-$, $NO_3^-$, $BF_4^-$, or $SO_4^{--}$.

Materials that can be used as a substrate for the image-forming medium of the invention are plates and films, for example, formed of glasses, metals including aluminum, ceramics, and plastics.

These substrates need to be electro-conductive when used for the monomolecular film of a metal chelate compound to emit light under the action of an electric field. Accordingly, insulating substrates such as glasses and plactics for this purpose need to be made electro-conductive by surface treatment.

In the case of a display medium, at least one substrate needs to be transparent in order to identify the light emitted from the chelate compound through the substrate. For treating such a transparent substrate to give conductivity thereto while keeping the transparency, the vapor deposition of $SnO_2$ on the substrate can be taken as a typical example of the method.

The substrate surface on which a monomolecular film or a monomolecular built-up film is to be formed should be in a surface-chemically enough cleaned state. If the surface cleaning is insufficient, a monomolecular layer will be disordered when transferred from the water surface onto the substrate surface, thereby forming inferior monomolecular film or built-up film, or the film will peel off from the substrate surface, making difficult the formation of a monomolecular film or built-up film. For instance, a sufficiently cleaned substrate surface having hydrophilicity can be obtained by dipping a glass substrate in a chromic acid mixture, washing the substrate with distilled water, and drying it in a cleaned gas gream. On the other hand, molten iron (III) stearate is well spread on the above-mentioned cleaned substrate surface, and the resulting coat is rubbed strongly with a clean cloth, a monomolecular film of iron (III) stearate will be formed with the hydrophilic groups facing the substrate surface, thus giving a hydrophobic substrate surface.

For producing the image-forming medium of the invention by laminating a monomolecular film or a monomolecular built-up film of the above-mentioned chelate compound on the above-mentioned substrate, the Langmuir-Blodgett method developed by I. Langmuir, / for example, is used, This method is to made a monomolecular film or a monomolecular built-up film by utilizing the fact that molecules of a compound each containing both a hydrophilic group and a hydrophobic group suitably maintaining the hydrophilicity-hydrophobicity balance can form a monomolecular layer on a water surface with the hydrophilic groups directed downward. The monomolecular layer on the water surface has a characteristic of a two-dimensional system. When the molecules are sparsely scattered on the water surface, the two-dimensional ideal gas equation $$\pi A = kT$$

applies between the surface area A of each molecule and the surface pressure $\pi$, where k represents the Boltzmann's constant and T represents an absolute temperature, and the molecules form "a gas film". When the A is made enough small, the interaction between the molecules becomes stronger, forming "a condensed film" (or a solid film) of two-dimensional solid. This condensed film can be transferred, one layer for each time, onto the surface of a glass substrate or the like. Using this method, a mononuclear film or a monomolecular built-up film is produced, for instance, in the following way:

First a metal chelate compound is dissolved in a solvent, and the solution is developed on a water surface to allow the chelate compound to separate out in film form. Then a partition plate or a float is set to limit the surface area of the extended chelate layer, that is, to control the aggregation state of the layer-forming chelate compound so that the layer may not be spread excessively by free diffusion of the compound on the water surface. Thus a surface pressure $\pi$ proportional to the aggregation degree is generated. That is, a surface pressure $\pi$ suited for the production of a monomolecular film or a monomolecular built-up film can be established by moving the partition plate to decrease the surface area of the extended chelate layer, control the aggregation state, and raise the surface pressure gradually. While maintaining this surface pressure, a clean flat substrate with its surface kept vertical, is gently moved up and down across the water surface, thereby transferring the monomolecular layer of the metal chelate compound onto the substrate. While the monomolecular film is produced in this manner, the built-up film having a desired number of monomolecular layers is produced by repeating the above procedure.

Besides the above described vertical dipping method, there can be applied the horizontal contact method and the rotating cylinder method to transfer a monomolecular layer onto a substrate. The horizontal contact method comprises bringing a substrate surface kept horizontal into contact with a monomolecular layer on a water surface, thereby transferring the layer onto the substrate. The rotating cylinder method comprises bringing a horizontally directed cylindrical substrate into contact with a monomolecular layer on a water surface while rotating the substrate, thereby transferring the monomolecular layer onto the substrate surface. In the first monomolecular layer formed on a substrate by the vertical dipping method, the molecules are directed with their hydrophilic groups facing the substrate surface. On moving the substrate up and down as stated above, one monomolecular layer is built up by each movement. In the ascending step and the descending step, the layer-forming molecules are oriented in the reverse directions. Accordingly, this method gives the Y-type of built-up film that has two types of interfaces in alternate order, having hydrophilic groups arranged face to face at the interface of the layers or having hydrophilic groups face to face. In contrast, the horizontal contact method gives a monomolecular layer in which hydrophobic groups face the substrate. In the built-up film formed by this method, the direction of the layer-forming molecules does not alternate, that is, this method gives the X-type of built-up film that has hydrophobic groups oriented to the substrate sides of all the layers. On the contrary, the built-up film haivng hydrophilic groups oriented to the substrate sides of all the layers is called Z-type of built-up film.

Methods for transferring a monomolecular layer onto a substrate are not limited to the above three methods. When a large area substrate is used, it is also possible that a roll of continuous substrate is unwound and pushed foward into water covered with a monomolecular layer. It may be noted that the above-mentioned molecular orientations with respect to the substrate area based merely on principles and can be varied by surface treatment of the substrate or some other method.

Details of these operations for monomolecular film transfer are already known; for example, these are described in "Shin Jikken Kagaku Koza, Vol. 18, "Kaimen to Koroido" ("New Textbook on Experimental Chemistry", Vol. 18, "Interface and Colloid"), pp. 498–507, published by Maruzen Co., Ltd.

It has been found that a monomolecular built-up film is better produced by sufficient drying of the first monomolecular layer to remove the water and solvent, followed by forming the second monomolecular layer, whereby the build-up operation can be accomplished smoothly without causing delamination. It has also been ascertained by many experiments that the thickness of the thus formed built-up film is equal to the molecular length of the metal chelate compound multiplied by the number of laminations (number of monomolecular layers).

The monomolecular film or the monomolecular built-up film thus formed on a substrate is sufficiently strong in adhesion to the substrate as well as in adhesion between each two neighbouring layers, so that the separation from the substrate or the delamination at the interface between layers seldom occurs. However, a bond layer can be provided between the substrate and the monomolecular film or between each two adjacent layers in the monomolecular built-up film, for the purpose of further reinforcing the adhesion. The adhesion can also be reinforced by selecting proper conditions of monomolecular film formation, for example, the hydrogen ion concentration in the water phase, ion species therein, and surface pressure.

The principle of image formation by using the image-forming medium of the invention is described below.

Figure 10A:
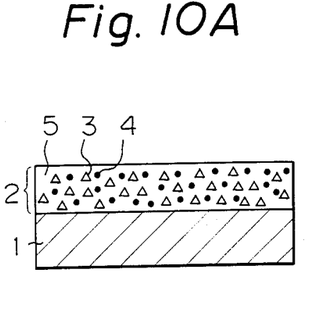
FIGS. 10 and 11 are schematic diagrams showing the respective constructions of a prior art recording medium and display medium.
Figure 10B:
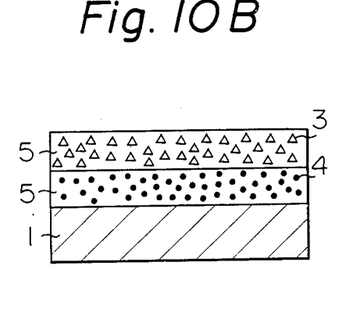

FIGS. 10A and 10B are schematic diagrams showing structures of conventional recording media wherein a metal chelate compound is used. The medium of FIG. 10A comprises a substrate 1 overlaid with a recording layer formed of a dispersion, in a binder, of a metal chelate compound 3 and a reactant 4, such as a ligand or reducing agent, which causes the chelate compound to form a color under the action of active energy. In the medium of FIG. 10B, a metal chelate compound 3 and a reactant 4 which are capable of reacting with each other are separately dispersed in a binder 5 to construct a pair of layers. Such a structure raises the foregoing problems of the too thick layer, the deficient resolution of recorded images, the liability to produce fog, etc.

Figure 1A:
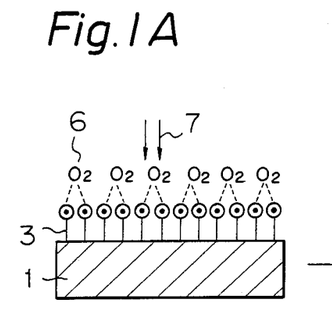
Figure 1B:
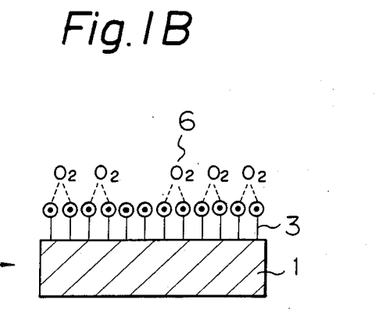

The first image formation process using an image-forming medium of the invention is based on the desorption of gas molecules from the metal chelate compound arranged at one surface of the medium, by exerting light or heat in the form of active energy signals on the medium. FIGS. 1A and 1B are a schematic representation of this process. The image-forming medium comprises a monomolecular film of such a metal compound 3 as shown in (1—d) above or a built-up film of monomolecular layers thereof formed on a substrate 1. On placing this image-forming medium, for instance, in an atmosphere of oxygen, molecules 6 of the oxygen gas are adsorbed on chelae molecules that construct the film at the surface (FIG. 1A). The image-forming medium placed in a non-oxygen atmosphere is irradiated with signals of active energy 7 such as ultraviolet rays or heat rays, thereby desorbing gas molecules 6 from the irradiated portion of the medium (FIG. 1B). Oxygen molecules on the medium are desorbed according to the original image by irradiating the meidum with signals of active energy corresponding to the original image. The metal chelate compound on which oxygen molecules are adsorbed is different in absorption spectrum from the metal chelate compound from which oxygen molecules have been desorbed. Therefore the image signals recorded on the image-forming medium can be read out by irradiating it with the light beam of such an intensity as not to cause the desorption of oxygen molecules and detecting the difference in absorption spectrum. When the recorded information becomes unnecessary, the image forming medium is exposed to an oxygen atmosphere to adsorb oxygen molecules again on the oxygen-eliminated portion (recorded portion), whereby the record can be erased and the reuse of the medium is made possible.

For this process, an image-forming medium comprising a single-layer monomolecular film of metal chelate compound formed on a substrate is preferred to the one comprising a built-up film of monomolecular layers in view of exact detection of the difference in absorption spectrum.

The second image-forming process using an image-forming medium of the invention is based on the reduction of metal ions in the metal chelate compound of the medium to metal atoms by exerting light, heat, or electric power in the form of active energy signals, thereby visualizing an image. FIGS. 2A to 6B are schematic representations of processes of this type.

Figure 2A:
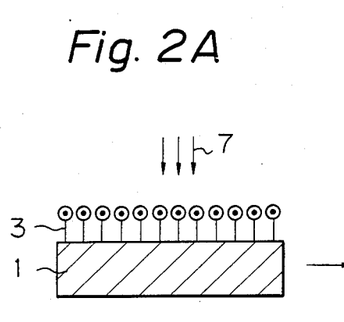
Figure 2B:
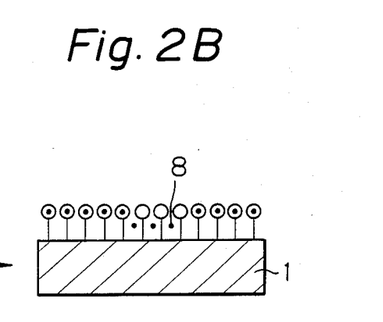

The process shown in FIGS. 2A and 2B is firstly explained. The image-forming medium used in this process has a simplest structure comprising a monomolecular film or monomolecular built-up film of a metal chelate compound, formed on a substrate 1. On irradiating this medium with signals of active energy, for example, ultraviolet rays or heat rays (FIG. 2A), metal 8 separates out from the metal chelate compound in the irradiated portion of the film to record an image (FIG. 2B). In this case of this medium, the metal 8 is ionized by exposing the medium to a suitable oxidizing atmosphere to regenerate the chelate compound, whereby the recorded image can be erased and the medium can be reused.

Figure 3A:
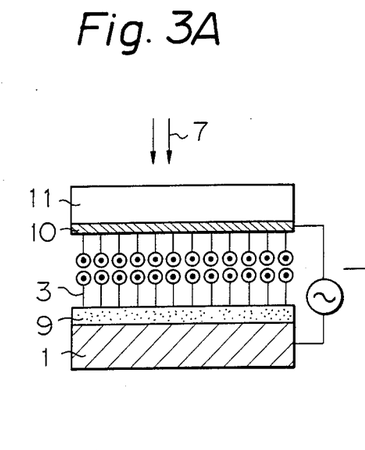
Figure 3B:
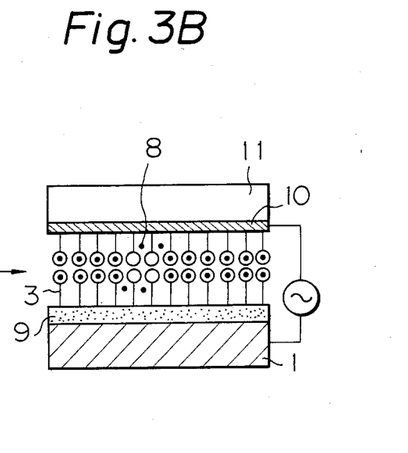

In the case of FIGS. 3A and 3B, the image-forming medium is a laminate composed, from bottom to top, of an electroconductive substrate 1, a photoconductive film 9, a monomolecular film or monomolecular built-up film of a metal chelate compound 3, and a transparent electrode 10 supported by a layer 11. On irradiating this medium, for example, with light signals, the photoconductive film in the irradiated portion becomes conductive (FIG. 3A), and on applying then a voltage across the substrate 1 and the transparent electrode 10, metal 8 separates out from the metal chelate compound in the strong electric fields (corresponding with the light-irradiated regions), thus recording an image (FIG. 3B).

Figure 4A:
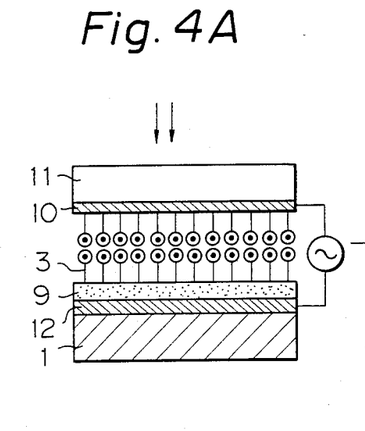
Figure 4B:
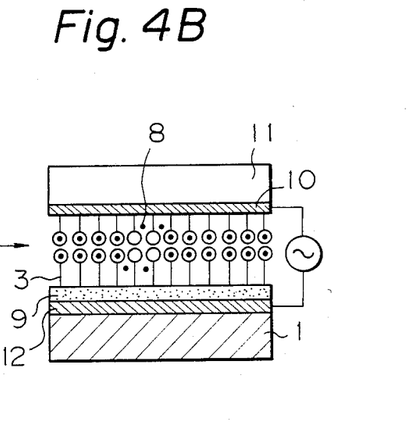

FIGS. 4A and 4B show a modification of the image-forming medium shown in FIGS. 3A and 3B. This modified medium is constructed by using an insulating material as the substrate 1 and inserting an electrode 12 between the substrate 1 and the photoconductive layer 9. The process for image formation in this case is not different at all from the process shown in FIGS. 3A and 3B.

Figure 5A:
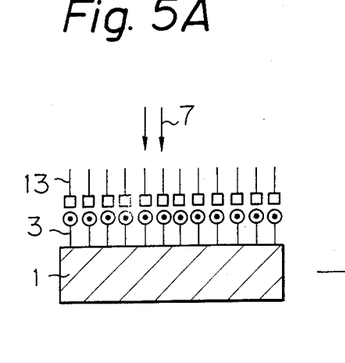
Figure 5B:
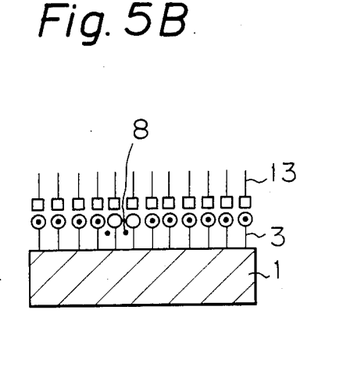

In the case of FIGS. 5A and 5B, the image-forming medium comprises a substrate 1 overlaid successively with a monomolecular film or monomolecular built-up film of a metal chelate compound 3 and with a monomolecular film or monomolecular built-up film of a reducing compound 13. It is possible to reverse this order of laminating the metal chelate compound and the reducing compound relative to the substrate 1. On irradiating this image-forming medium, for example, with ultraviolet rays (FIG. 5A), the reducing power of the reducing compound 13 in the irradiated portion of the film becomes stronger and reduces the metal chelate compound in the portion to separate metal 8, thus recording an image (FIG. 5B). In this case, simultaneous heating, for example, at the light exposure is effective for performing the reduction of metal ions efficiently.

Figure 6A:
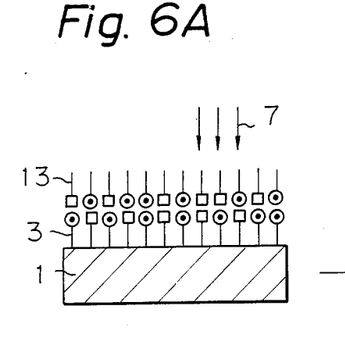
Figure 6B:
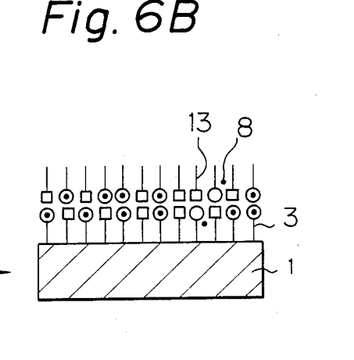
Figure 7A:
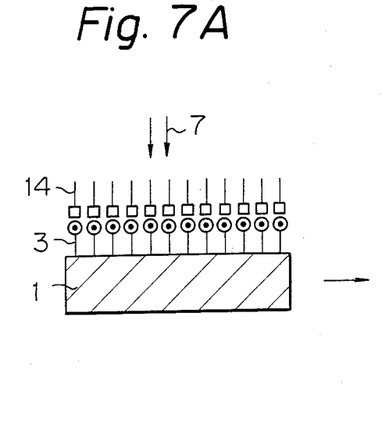
Figure 7B:
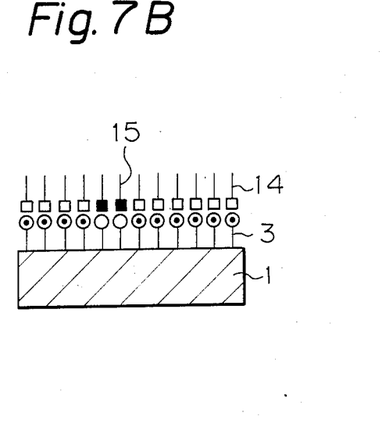

The image-forming medium of FIGS. 6A and 6B comprises a monomolecular film or monomolecular built-up film made of a mixture of a metal chelate compound 3 and a reducing compound 13, unlike the medium of FIGS. 5A and 5B in which monomolecular films of metal chelate compound and reducing compound or built-up films thereof are formed separately. The principle of image formation in this case is the same as in the case of FIGS. 5A and 5B.

The third image-forming process using an image-forming medium of the invention is based on the chelate ligand exchange reaction between a metal chelate compound and a metal-free ligand in the medium caused by exerting light or heat in the form of active energy signals on the medium to form a colored image. The ligand exchange reaction herein means the series of elementary reactions caused by exerting activation energy on an $L^1$—M type of metal chelate compound ($L^1$ is a ligand, M is a metal ion) in the presence of another ligand $L^2$ to decrease the valency of the metal ion in $L^1$—M (reduce the metal ion) and enhance the reactivity of $L^1$—M (to $L^1$—M*). Thus a colored $L^2$—M is produced from the colorless or pale colored $L^1$—M. When the above reaction is further succeeded by the energy transfer reaction the production of the colored $L^2$—M from the $L^1$—M will take place according to the chain-reaction and a high density image will be formed.

Figure 8A:
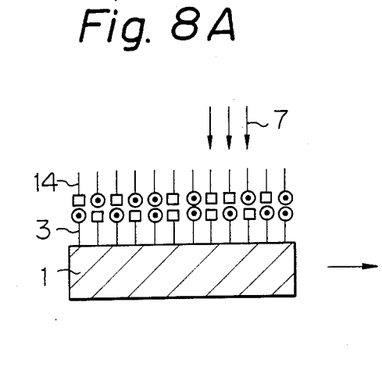
Figure 8B:
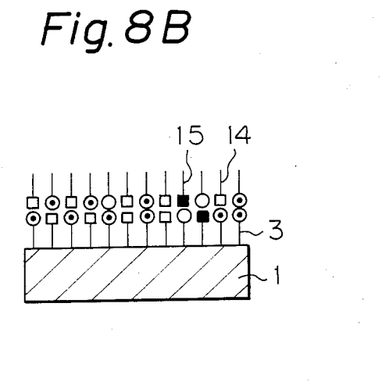

FIGS. 7A to 8B are schematic representations of this process. That is, a colorless or pale colored metal chelate compound 3 on a substrate 1 is irradiated with active energy 7 according to an original image (FIGS. 7A and 8A), thereby causing the ligand exchange reaction of the chelate compound with the metal-free ligand 14 adjacent thereto without inserting any binder, thereby forming an image of a colored metal chelate compound 15 (FIGS. 7B and 8B).

The principle of display by using the image-forming medium of the invention is described below.

Figure 11:
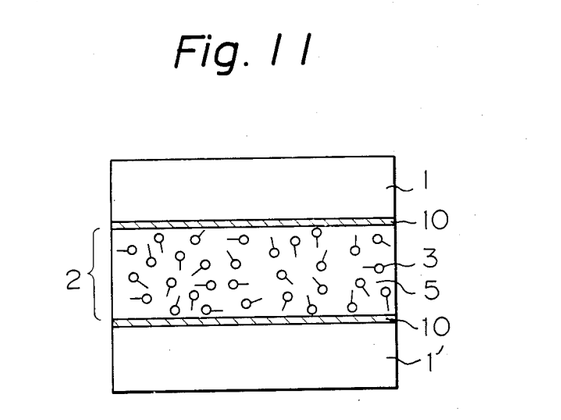

FIG. 11 is a schematic diagram showing the structure of a conventional display medium using a metal chelate compound. This medium comprises a display layer 2 of a dispersion of a metal chelate compound 3 in a binder 5, sandwiched between supporting substrates 1 and 1' having each a transparent electrode 10 on the inner side. While the display layer of course can be formed of a metal chelate compound alone without using any binder, it is necessary in this case to insert an adhesive layer between the display layer and each electrode, since there is usually no adhesiveness between the metal chelate compound and the electrode. Because of such a structure, the display layer is undesirably thick and hence there arises the problem of requiring a high voltage for display.

Figure 9A:
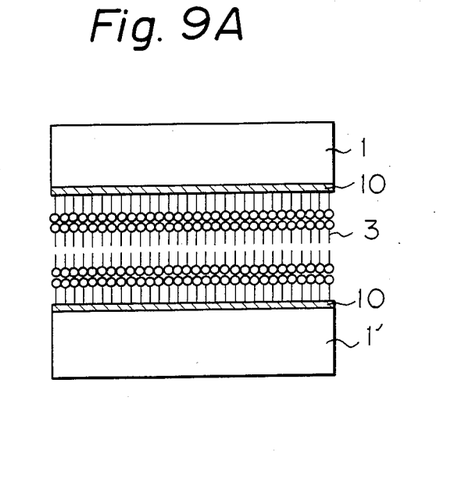
FIG. 9 is a schematic diagram showing the construction of an image-forming media according to the invention.
Figure 9B:
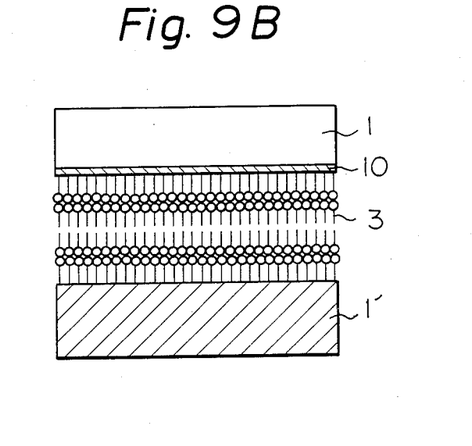

The principle of display by using the image-forming medium of the invention does not differ from that of display by using the conventional image-forming medium in that a metal chelate compound in the image-forming medium is caused to emit light by exerting a.c. electric fields or the like as active energy signals. However, the display medium layer 2 in the medium of the invention is extremely thin since the layer consists of a monomolecular film or monomolecular built-up film of a metal chelate compound 3 as shown in FIGS. 9A and 9B. In the case of FIG. 9B, the lower supporting substrate 1 is formed of a colored electroconductive material and the upper supporting substrate 1' is formed of a transparent material such as glass and has a transparent electrode 10. In the case of FIG. 9A, either of the upper and lower supporting substrate 1 and 1' is formed of a transparent material such as glass and has a transparent electrode 10.

The image-forming medium of the invention, as stated already, operates with a very low voltage, has extremely high sensitivity to energy signals, and is economical since it can be manufactured with a minute amount of metal chelate compound.

The image-forming medium of the invention is illustrated in more detail with reference to the following examples.

EXAMPLE 1

A metal chelate compound represented by the formula was dissolved in chloroform. The resulting solution was developed on a water surface to form a monomolecular layer thereon. From this layer (surface pressure 35 dyne/cm), a monomolecular film was formed by the horizontal contact method on a hydrophobic substrate constituted of a 100-$\mu$ thick Mylar film. The image-forming medium thus obtained was allowed to stand in a stream of oxygen (98% purity) for about one hour to adsorb oxygen on the monomolecular film of the metal chelate compound at the medium surface. Then the medium was covered with a mask having a prescribed image, and irradiated in an atmosphere of nitrogen with a xenon flash lamp (light intensity 4.1 J/cm$^2$). As a result, oxygen molecules were desorbed from the irradiated areas, where a marked change in the absorbance at 355 $\mu$m was observed. The recorded image could be read out by detecting the change in the absorbance at 355 $\mu$m with a light beam of intensity 4.1 mW/cm$^2$.

On exposing again this written medium to oxygen gas for about one hour, oxygen was adsorbed again on the recorded portion from which oxygen had been desorbed, thereby this medium could be regenerated to the original state. This image-forming medium was subjected to 50 repeated operations of the above recording and erasing, where the precision of recorded images was not impaired, thus confirming that this medium functions as a reusable image-forming medium.

EXAMPLE 2

A solution of a metal chelate compound of the formula IrBr(CO)[P(C$_2$H$_5$)$_3$](P(C$_{16}$H$_{33}$)$_3$)]H$_2$ in chloroform was developed on a water surface, forming a monomolecular layer thereon. From this monomolecular layer (surface pressure 35 dyne/cm), a monomolecular film was formed by the horizontal contact method on a hydrophobic substrate (on a monomolecular film of cadmium stearate supported by a glass plate).

The thus prepared image-forming medium was irradiated with a xenon flash lamp in the same manner as in Example 1. As a result, hydrogen molecules that had been adsorbed on the irradiated portion were desorbed and a marked change in the absorbance at 330 $\mu$m was observed in the portion. In the same manner as in Example 1, the recorded image could be read out by detecting the change in the absorbance at 330 $\mu$m.

On about one-hour standing of this written medium in a stream of hydrogen, hydrogen was adsorbed again on the recorded portion from which hydrogen had been desorbed, thereby this image-forming medium could be regenerated to the original state.

EXAMPLE 3

A solution of a metal chelate compound of the formula in chloroform (concentration 1×10$^{-3}$ mole %) was developed on a water surface, forming a monomolecular layer of the above compound. From this monomolecular layer (surface pressure 35 dyne/cm), a monomolecular film was formed by the horizontal contact method on a 100-$\mu$ thick Mylar film.

The thus prepared image-forming medium was irradiated with a xenon flash lamp (light intensity 4.1 J/cm$^2$). As a result, the irradiated areas turned pale brown and the visible-light absorbance changed. Thus the recorded image could be read out by detecting the change in the absorbance at 500 $\mu$m.

The brown color disappeared on about one-hour immersion of this written medium in dilute nitric acid (0.05N). Thus the medium could be regenerated to the original state. This image-forming medium was subjected to 30 repeated operations of the above recording and erasing, where the precision of recorded images was not impaired. Thus it was confirmed that this medium functions as a reusable image-forming medium.

EXAMPLE 4

A solution of a metal chelate compound of the formula in chloroform (concentration $1 \times 10^{-3}$ mole %) was developed on a water surface, forming a monomoledular layer of the above compound. From this monomolecular layer (surface pressure 35 dyne/cm), a built-up film of three monomolecular layers was formed by the LB method on a transparent electrode of $SnO_2$ film formed by the horizontal contact method and supported by a glass plate. On the other hand, a 5-μ thick photoconductive polyvinylcarbazole/trinitrofluorene film was laminated on the same transparent $SnO_2$ electrode supported by a glass plate as mentioned above. This photoconductive-film-supporting electrode plate was superposed upon the above built-up-film-supporting electrode plate so that the photoconductive film would become in contact with the built-up film, and the plates were bonded together by applying pressure.

The thus prepared image-forming medium was irradiated with a 500-W ultra high pressure mercury lamp (light intensity 8.8 mW/cm²) through a prescribed mask while applying a voltage of about 100 volt d.c. between the electrodes with the built-up film side electrode as positive pole and the photoconductive film side electrode as negative pole. Thus a black image formed of silver atoms appeared in the irradiated areas. This image was very sharp and superior in the degree of resolution.

EXAMPLE 5

A solution of a metal chelate compound of the formula in chloroform (concentration $1 \times 10^{-3}$ mole %) was developed on the surface of an aqueous cadmium chloride solution (concentration $1 \times 10^{-4}$ mole %) to form a monomolecular layer of the above compound on the surface. From this layer (surface pressure 35 dyne/cm), a built-up film of three monomolecular layers was formed on a glass plate by the LB method. Then a solution of a ruthenium-dipyridyl complex represented by the formula in chloroform (concentration $5 \times 10^{-4}$ mole %) was developed on the surface of an aqueous cadmium chloride solution (concentration $1 \times 10^{-4}$ mole %) to form a monomolecular layer of the above compound on the surface. From this monomolecular layer, a built-up film of two monomolecular layers was formed further on the above formed three-layer monomolecular built-up film.

The thus prepared image-forming medium was irradiated with a xenon flash lamp (light intensity 3.2 J/cm²) through a prescribed mask. As a result, the irradiated areas turned black, forming a visible image. The resolution degree of the image observed through a microscope was 1000 lines/m.

EXAMPLE 6

A metal chelate compound of the formula and a ruthenium-pyridyl complex, the same as used in Example 5, were dissolved in molar proportions of 1:1 in chloroform (concentration $1 \times 10^{-3}$ mole %), and developed on a water surface to form a mixed monomolecular layer of the above compounds on the surface. From this monomolecular layer (surface pressure 35 dyne/cm), a built-up film of three monomolecular layers was formed on a glass plate by the LB method.

The thus prepared image-forming medium was irradiated with an argon laser (output 2W) beam at a scanning speed of 20 m/sec. according to an original image. Then on heating the medium on a hot plate at about 80° C. for one minute, a black visible image formed of silver atoms appeared in the irradiated areas.

EXAMPLE 7

A 5-μ thick photoconductive film of a dispersion of finely divided titanium oxide in a polyvinyl butyral) (weight ratio 7:1) was formed on a transparent electrode of $SnO_2$ supported by a glass plate. On the other hand, a solution of a metal chelate compound of the formula in chloroform (concentration $5 \times 10^{-4}$ mole %) was developed on a water surface to form a monomolecular layer of the above compound. From this monomolecular layer (surface pressure 30 dyne/cm), a built-up film of 10 monomolecular layers was formed by the horizontal contact method on the above photoconductive resin film supported by a glass plate. The same transparent electrode supported by a glass plate as described above was bonded with pressure onto the surface of the built-up film of a monomolecular layers.

The thus prepared image-forming medium was image-exposed in the same manner as in Example 1, while applying a voltage of about 100 volt d.c. with the built-up film side electrode as positive pole and the photoconductive film side electrode as negative pole. As a result, a black image formed of silver atoms appeared in the irradiated portion. The image was very sharp and superior in the degree of resolution.

EXAMPLE 8

A solution of a metal chelate compound of the formula in chloroform (concentration $5 \times 10^{-4}$ mole %) was developed on a water surface to form a monomolecular layer of the above compound. From this monomolecular layer (surface pressure 35 dyne/cm), a built-up film of 5 monomolecular layers was formed by the horizontal contact method on each of two $SnO_2$ vapor deposition electrodes supported by glass plates, respectively. The two resulting plates were superposed with the built-up films facing each other, and was bonded with pressure to form an image-forming medium.

On applying a voltage of about 100 volt a.c. between the electrodes of the image-forming medium, an emission of light having a peak at about 600 nm was observed. This light emission stopped immediately on ceasing the voltage application. This ensures that this image-forming medium can be used as a display device.

EXAMPLE 9

A metal chelate compound of the formula was dissolved in a benzene-tetrahydrofuran (1:1 wt. ratio) mixture. The solution (concentration $5 \times 10^{-4}$ mole %) was developed on a water surface to form a monomolecular layer of the above compound. From this monomolecular layer (surface pressure 25 dyne/cm), a built-up film of 5 monomolecular layers was formed by the horizontal contact method on each of two $SnO_2$ vapor deposition electrodes suported by glass plates, respectively. The two resulting plates were superposed with the built-up films facing each other, and was bonded with pressure to form an image-forming medium.

On applying a voltage of about 100 volt a.c. between the electrodes of the image-forming medium, an emission of light having a peak at about 600 nm was observed. This light emission stopped on ceasing the voltage application. This ensures that this image-forming medium also can be used as a display device.

EXAMPLE 10

A compound of the formula and a metal chelate compound of the formula were dissolved at molar proportions of 1:1 in chloroform (concentration $1 \times 10^{-3}$ mole %). The solution was developed on the surface of an aqueous cadmium chloride solution (concentration $1 \times 10^{-4}$ mole %) to form a mixed monomolecular layer of the above compounds on the solution surface. From this monomolecular layer (surface pressure 35 dyne/cm), a built-up film of 5 mixed monomolecular layers was formed on a glass plate by the LB method.

The thus prepared image-forming medium was irradiated with a 500-W ultra high pressure mercury lamp (light intensity 8.8 mW/cm$^2$) through a prescribed mask. As a result, the irradiated portion presented a dense red-purple color. The resolution degree of the colored image observed through a microscope was 1000 lines/mm.

EXAMPLE 11

A compound of the formula and a metal chelate compound of the formula were dissolved at molar proportions of 1:2 in benzene (concentration $1 \times 10^{-3}$ mole %). The solution was developed on a water surface to form a mixed monomolecular layer of the above compounds on the water surface. From this monomolecular layer (surface pressure 30 dyne/cm), a single layer monomolecular film was formed on a glass plate by the LB method.

The thus prepared image-forming medium was irradiated with a 500-W ultra high pressure mercury lamp (light intensity 8.8 mW/cm$^2$) through a prescribed mask. As a result, the irradiated areas presented a dense blue color. The resolution degree of the colored image observed through a microscope was 1000 lines/mm.

EXAMPLE 12

A compound of the formula was dissolved in chloroform (concentration $5 \times 10^{-4}$ mole %), and developed on a water surface to form a monomolecular layer of the above compound. From this monomolecular layer (surface pressure 30 dyne/cm), a built-up film of two monomolecular layers was formed on a glass plate by the LB method. Then, a solution of a metal chelate compound of the formulas in chloroform (concentration $5 \times 10^{-4}$ mole %) was developed on a water surface to form a monomolecular layer of the compound. From this monomolecular layer (surface pressure 30 dyne/cm), a built-up film of two monomolecular layers was further formed by the LB method on the above-described built-up film.

The thus prepared image-forming medium was exposed to light in the same manner as in Example 1. As a result, the irradiated areas formed a green color. The resolution degree of the colored image observed through a microscope was 800 lines/mm.

EXAMPLE 13

A monomolecular film of the same metal chelate compound as used in Example 1 was formed by the horizontal contact method on a Mylar film (150-μ thick). This substrate coated with the monomolecular film with its surface kept vertical was dipped in water, and then a solution of a compound of the formula in chloroform (concentration $5 \times 10^{-4}$ mole %) was developed on the water surface to form a monomolecular layer. The dipped Mylar film was then taken up vertically to laminate a monomolecular film of the above metal-free compound on the monomolecular film of the metal chelate compound. Repeating the above procedure three times, an image-forming medium having a six-layer monomolecular built-up film of alternate constitution was prepared.

This image-forming medium was exposed to light in the same manner as in Example 1. As a result, the irradiated areas formed a dense red-purple color. The resolution degree of the colored image observed through a microscope was 700 lines/mm.

Important features of the present invention are summarized as follows:

(1) The image-forming medium of the invention is extremely sensitive to energy signals.

(2) According to the invention, fog-free and noiseless image formation can be achieved with extremely high sensitivity because the recording layer of the image-forming medium contains only a metal chelate compound as recording material.

(3) The image-forming medium can be utilized as a regenerable medium where recording and erasing can be effected free, depending on the recording process.

(4) According to the invention, large-area image-forming media can be produced with ease since the monomolecular film or the built-up film of monomolecular layers can be formed by the LB method.

(5) The image-forming medium of the invention is superior in productivity and economy since the structure thereof is very simple and a small amount of method chelate compound suffices for the production thereof.

What is claimed is:

1. A medium for image formation which comprises a monomolecular film or monomolecular built-up film of a metal chelate compound on a substrate in which the metal chelate is selected from the group consisting of:

$$IrX(CO)(PPh_3)(PPh_2Ph\text{---}R)Y; \quad (1\text{-a})$$

$$IrX(CO(PR_3)(PR'_3)Y, \quad (1\text{-b})$$

wherein X is a halogen atom, Ph—R is phenyl substituted by an alkyl of 10 to 30 carbon atoms; Y is $O_2$, $H_2$, $SO_2$, CO, HCl, HBr, olefin, or halogenated alkyl; and R and R' are each the same or different alkyl group having 10 to 30 carbon atoms;

$$Y'Co(PPh_3)(PPh_2Ph\text{---}R) \quad (1\text{-c})$$

wherein Y' represents $H_2$, $N_2$, $Cl_1$, $I_2$, or CO; and Ph—R is phenyl substituted by an alkyl of 10 to 30 carbon atoms;

and wherein R″ is alkyl having 8 to 30 carbon atoms wherein said metal chelate compound is capable of adsorbing and desorbing reversibly gaseous molecules under the action of activation energy.

2. A process for image formation which comprises applying active energy signals to the image-forming medium of claim 1 to desorb gaseous molecules and to form an image therein.

* * * * *